United States Patent
Moeller et al.

(10) Patent No.: US 12,461,945 B2
(45) Date of Patent: Nov. 4, 2025

(54) METHOD FOR SUPPORTING A DATA TRANSFER, COMPUTER PROGRAM PRODUCT, TRANSMITTER SYSTEM, AND TRANSMISSION SYSTEM

(71) Applicant: KSB SE & Co. KGaA, Frankenthal (DE)

(72) Inventors: Romy Moeller, Frankenthal (DE); Mario Reinsdorf, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/704,650

(22) PCT Filed: Oct. 14, 2022

(86) PCT No.: PCT/EP2022/078640
§ 371 (c)(1),
(2) Date: Apr. 25, 2024

(87) PCT Pub. No.: WO2023/072626
PCT Pub. Date: May 4, 2023

(65) Prior Publication Data
US 2025/0013667 A1    Jan. 9, 2025

(30) Foreign Application Priority Data
Oct. 26, 2021   (DE) ...................... 10 2021 127 831.7

(51) Int. Cl.
*G06F 7/00*        (2006.01)
*G06F 16/28*       (2019.01)

(52) U.S. Cl.
CPC ................................. *G06F 16/285* (2019.01)

(58) Field of Classification Search
CPC ...................................................... G06F 16/285
USPC ................................................. 707/600–899
See application file for complete search history.

(56) References Cited

U.S. PATENT DOCUMENTS

2009/0271412 A1* 10/2009 Lacapra ................ G06F 16/178

FOREIGN PATENT DOCUMENTS

WO    WO 2018/125358 A1    7/2018

OTHER PUBLICATIONS

International Search Report (PCT/ISA/210) issued in PCT Application No. PCT/EP2022/078640 dated Jan. 31, 2023 with English translation (5 pages).
German-language Written Opinion (PCT/ISA/237) issued in PCT Application No. PCT/EP2022/078640 dated Jan. 31, 2023 with English translation (12 pages).

* cited by examiner

*Primary Examiner* — Isaac M Woo
(74) *Attorney, Agent, or Firm* — Crowell & Moring LLP

(57) ABSTRACT

A method for supporting a data transfer of project data includes providing a plurality of data units and acquiring unit-related meta data. The method also includes creating a plurality of individual containers. One of the data units and the assigned metadata are stored separately from each other in each individual container. The method also includes acquiring project-related metadata for information about a data context of the individual containers. The method also includes creating a main container in which the individual containers and the project-related metadata are stored separately from each other. The method also includes outputting the main container via the transmitter system for the receiver system.

15 Claims, 4 Drawing Sheets

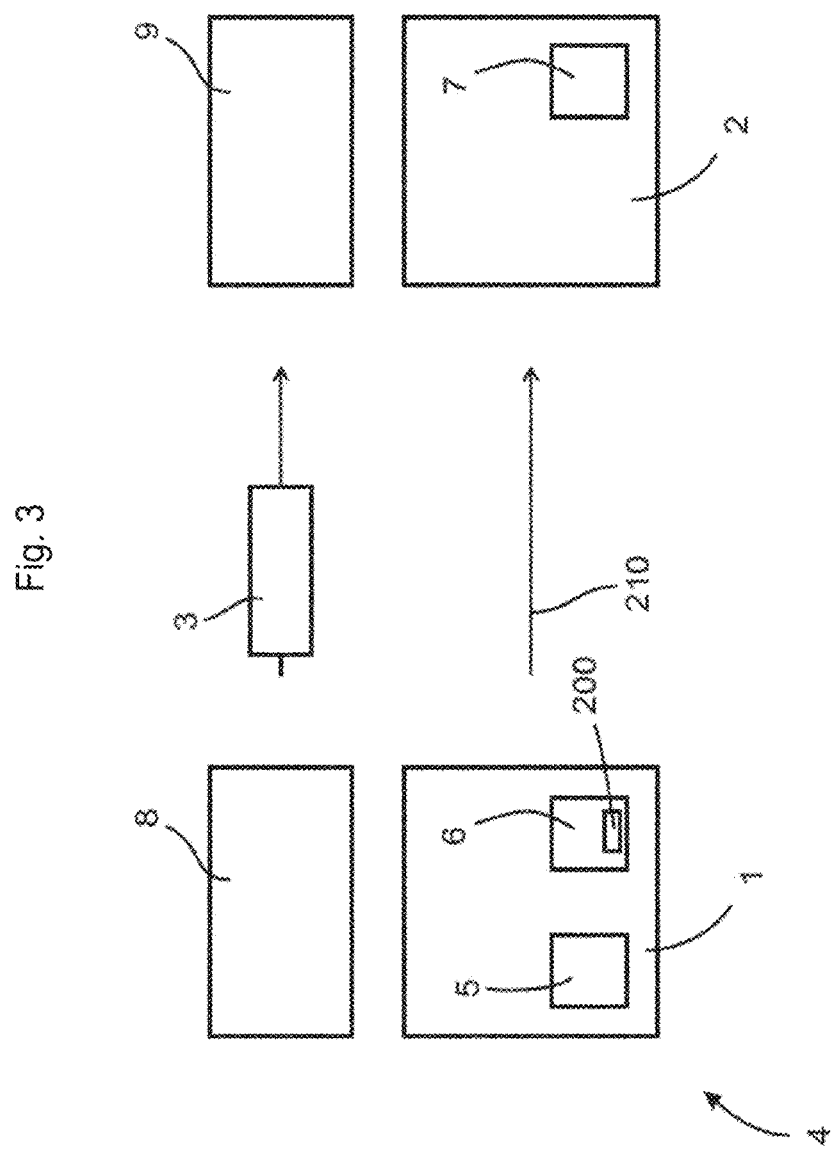

METHOD FOR SUPPORTING A DATA TRANSFER, COMPUTER PROGRAM PRODUCT, TRANSMITTER SYSTEM, AND TRANSMISSION SYSTEM

CROSS REFERENCE TO RELATED APPLICATION

This application claims priority under 35 U.S.C. § 119 from German Patent Application No. 10 2021 127 831.7, filed Oct. 26, 2021, the entire disclosure of which is herein expressly incorporated by reference.

BACKGROUND

The present disclosure relates to a method for supporting a data transfer, a computer program product, a transmitter system and a transmission system.

It is common for project data in the form of technical product data, such as CAD models or data sheets, to be provided by the manufacturer to a customer in electronic form. The corresponding project data is often provided in a manufacturer's project database, from which the project data is manually searched and compiled for the customer. At the same time, metadata is also often read manually from the project database and assigned to the individual documents by creating corresponding files from scratch. The customer must also read out the data manually and sort it into a receiver database.

The manual tasks involved in the data transfer are complex and time-consuming. This can also have a detrimental effect on the further processing of the data.

SUMMARY

It is an object of the present disclosure to at least partially remedy the above disadvantages known from the prior art. In particular, it is an object of the present disclosure to simplify a data transfer from a transmitter system to a receiver system, preferably by means of a transfer-compatible data structure.

This object is achieved by a method having the features of claim 1, a computer program product having the features of claim 13, a transmitter system having the features of claim 14, and a transmission system having the features of claim 15. Other features and details of the disclosure emerge from the respective dependent claims, the description and drawings. Features and details that are described in connection with the method according to the disclosure are also valid, of course, in connection with the computer program product according to the disclosure, the transmitter system according to the disclosure and/or the transmission system according to the disclosure, and vice versa in each case, so that with regard to the disclosure, reference is or can always be made reciprocally to the individual aspects of the disclosure.

According to a first aspect of the disclosure, a method for supporting a data transfer of project data from a transmitter system to a receiver system is provided. The method comprises at least the following steps:

provided a plurality of data units of the project data by the transmitter system, preferably by a computing unit of the transmitter system, acquiring unit-related meta data, in particular for information on a data context for each of the data units, preferably by the computing unit, creating a plurality of individual containers, wherein one of the data units and the unit-related metadata, assigned in particular to the respective data unit, are stored separately from each other in each individual container, preferably by means of the computing unit, acquiring project-related meta data, in particular for information on a data context, of the individual containers, preferably by means of the computing unit, creating a main container in which the individual containers and the project-related metadata are stored separately from each other, preferably by means of the computing unit, outputting the main container by the transmitter system for the receiver system, preferably by means of the computing unit.

The project data can preferably form part of a manufacturing process of a device. The project data can include, for example, technical data in the form of documents, technical drawings, image data and/or the like.

The data units may comprise machine—and/or human readable information. In particular, the data units are digital data units. In particular, each data unit can be provided in the form of a separate file and/or a separate, digital document. The data units can have different file formats, depending on their purpose within a project.

Unit-related metadata can preferably be understood to mean metadata that is assigned to one of the data units. The project-related metadata can preferably be understood to mean metadata that is assigned to the totality of the project data and/or the individual containers. The information about a data context of the unit-related metadata and/or the project-related metadata can in particular comprise a data type, a data classification, a data origin, information about data content, version information and/or the like. This means that the project-related metadata, in particular, has higher priority than the unit-related metadata. The acquisition of the unit-related and/or project-related metadata can be carried out manually or automatically. For example, to acquire the unit-related metadata a user query can be carried out, by means of which a user can map the unit-related metadata to the respective data unit and/or enter the metadata for the respective data unit. For example, to acquire the project-related metadata a user query can be carried out, by means of which a user can assign the project-related metadata to the individual containers and/or a project. It may also be provided that the unit-related metadata include an identification, e.g. an identification number, of the data units. The project-related metadata can include the identification of the data units and/or an identification of the individual containers.

The individual containers and/or the main container can preferably be a digital container, in which the data units and the unit-related metadata are stored separately from each other. In particular, the data units and the unit-related metadata can be combined in the individual container. The storage in the individual container can be effected by storing the data units and the unit-related metadata in such a way that access to the data units and the unit-related metadata is only possible by opening the individual container. Thus, the storage of the data units and the unit-related metadata can comprise a physical and/or digital mapping to the respective individual container. The individual containers can be used to compress and/or encrypt the data units and/or the unit-related metadata. For example, the individual container can be created in the form of a zip file. In particular, the main container, the individual containers and the data units therefore form different data levels of a data structure.

For the separate storage of the respective data units and the unit-related metadata in the individual container, for example, a file can be generated and/or stored in the individual container for the respective data unit and the unit-related metadata.

The main container can be created in the same way as the individual containers are created. It can be provided that the individual containers and the project-related metadata are stored in such a way that access to the individual containers and the project-related metadata is only possible by opening the main container. Thus, the storage of the individual containers and the project-related metadata can include a physical and/or digital mapping to the main container. When the main container is created, the individual containers and project-related metadata can be compressed and/or encrypted.

When the main container is output, this means in particular that the project-related metadata and the unit-related metadata and data units stored in the individual containers are also output. Outputting the main container can include output of the main container by the transmitter system, by means of which the main container can be provided to the receiver system automatically or manually. Preferably, the outputting of the main container comprises transmitting the main container from the transmitter system to the receiver system. The main container can be transmitted from the transmitter system to the receiver system via a communication link, such as a wireless connection and/or an Internet connection. However, it is also conceivable that the output of the main container comprises storing the main container on a, in particular external, data carrier. The data carrier can then be connected to the receiver system and read out by the receiver system. By intelligently arranging the unit-related metadata in the individual containers and the project-related metadata in the main container, it becomes easier for the receiver to read the project data into a receiver database. Furthermore, for each data level within the data structure, accessibility and/or testing, in particular for relevance, of the data in the underlying data levels can be facilitated.

In particular, all data stored in the main container is therefore output with the main container. Thus, creating the main container and the individual containers creates a transfer-compatible data structure. This enables a standardized format of the data structure to be provided for data transfer. The main container can be evaluated and/or interpreted by the receiver system in a defined manner. The separately stored unit-related and/or project-related metadata can advantageously provide a content summary for the receiver system in order to identify the transmitted data in a simple manner. Due to the separate storage of the unit-related and/or project-related metadata, it is not necessary to open the individual containers and/or data units in order to obtain information about the content, validity and/or assignment of the data.

Furthermore, in a method according to the disclosure it can be advantageously provided that the project data is assigned to a device that is to be produced, or has been produced and/or delivered, in particular wherein the unit-related metadata and/or the project-related metadata comprise identification information for assignment to the device. The device can preferably be, for example, a plant or other type of operational system. For example, the device may be formed by a pump and/or a pump system. In addition or alternatively, it may be provided that the device comprises, for example, a fitting, a motor and/or a sensor system. The device can advantageously be transferred from a transmitter plant to a receiver plant separately from the main container and/or together with the main container. The identification information may include, for example, a serial number, a barcode and/or a QR code. The identification information can be applied to the device in parallel in order to be able to assign the data units to the device in the receiver plant. In addition or alternatively, the identification information can be added to at least one of the data units, in order to be able to reliably assign the data units to the device even after the separation of the data by the receiver system.

Furthermore, in a method according to the disclosure it can be advantageously provided that the unit-related metadata is stored in machine-interpretable, i.e. in particular machine-readable, and/or human-interpretable, i.e. human-readable, form when the individual containers are created and/or that the project-related metadata is stored in machine-interpretable and/or human-interpretable form when the main container is created. The machine-readable metadata and the human-readable metadata are preferably stored separately from each other, which enables a defined, separate access. For example, the metadata can include a machine-interpretable file and a human-interpretable file. A machine-interpretable file can preferably be provided in the form of an XML file. A human-interpretable file can preferably be provided in the form of an PDF file. This allows the data in the receiving system to be advantageously read out, since not all files need to be searched with regard to specific data.

Furthermore, in a method according to the disclosure it is conceivable that the provision of the data units and/or the acquisition of the unit-related metadata comprises an automatic extraction of the data units from a project database of the transmitter system. It is preferable to take into account versioning of the data units in the project database during the extraction. To extract the data units, the project database can be automatically searched for project data associated with a specific project. Database-internal metadata for each of the data units and/or for the project can be read out in order to create the unit-related and/or project-related metadata. Due to the defined, transfer-compatible data structure, the data can thus be automatically extracted from the project database and prepared for data transmission. In particular, it is therefore not necessary for the metadata and/or data units to be read out manually from the project database. This allows the data transmission of the project data to be carried out efficiently and in a short time.

Furthermore, in a method according to the disclosure, it can advantageously be provided that an, in particular automatic, synchronization of the individual containers and/or the main container with the project database is carried out. During the synchronization, the individual containers and/or the main container can be stored in the project database, in particular in a transmission-ready form. For example, a data record can be created in the project database for the main container and/or for the individual containers during synchronization. At the same time, synchronization can ensure that the output of the project data is reliably documented. This allows full tracking of which data of a project was output at a later date. Preferably, manual synchronization with the project database can be omitted.

In a method according to the disclosure it is further conceivable that when the main container is output, a receiver database is accessed automatically, wherein the data units are read from the main container based on the unit-related and/or the project-related metadata and are stored in the receiver database of the receiver system. In particular, access can be made via a remote connection. For this purpose, the receiver database can comprise a receiving interface for automatically reading the project data and/or the transmitter system can comprise a transmitter interface for automatically outputting the main container. Due to the transmission-compatible data structure, a defined transmission can thus be carried out, which is automated on the receiver side. In particular, during access to the receiver database, database entries for the main container, the individual containers and/or the data units can be created in the receiver database automatically. Furthermore, the automated access allows a high level of reproducibility to be achieved, in which the output data is reliably stored in the receiver database.

It is also conceivable in a method according to the disclosure that the method comprises the following step:
  mapping a data content of at least one of the data units and/or at least one of the individual containers in at least one unique individual identifier, in particular by means of the computing unit.

Preferably, when the main container is created, the unique individual identifier is stored separately from the individual container, in particular from the individual container assigned to the respective data unit, and/or separately from the main container. Preferably, a unique individual identifier is created for each of the individual containers. It may be provided that the individual identifiers of the individual containers are saved in a common file or that a separate file is created for each of the individual containers. The at least one individual identifier can be computed in particular by means of a hash function. Therefore, the individual identifier can preferably be a hash code. The individual identifier may include a string that is calculated from the data content as a result of the hash function. Thus, the individual identifier can advantageously be a unique identifier. By mapping the data content in the individual identifier, the individual containers and/or the data units can be reliably validated on the receiver side using the individual identifier without directly accessing the individual containers and/or the data units. For example, it can be detected whether the individual containers and/or the data units are manipulated after the output of the main container. In this case, if the data content is mapped on the receiver side, the individual ID does not match the stored individual ID. This can improve security and/or reliability of data transmission.

In addition, in a method according to the disclosure, the method can advantageously comprise the following step:
  mapping of data content of the main container in a unique main identifier of the main container, in particular by means of the computing unit.

Preferably, the unique main identifier is stored separately from the main container and/or output separately from the main container for the receiver system. Preferably, the main container and the main ID are output via different interfaces and/or at different times. For example, the main identifier can be distributed as a file on a data carrier, while the main container is transmitted over the Internet. Alternatively, for example, the main identifier and the main container could be sent to the receiver system by e-mail one after the other. The data content of the main container can be mapped in the same way as the data content of the data units and/or the individual container. The main identifier can be computed in particular by means of a hash function. Therefore, the main identifier can preferably be a hash code. Thus, the main identifier can advantageously be a unique identifier. By mapping the data content in the main identifier, the main container can be reliably validated by the receiver against the main identifier without directly accessing the individual containers and/or the data units contained. In particular, due to the main identifier, it is not necessary to open the main container and/or the individual containers in order to check the validity of the main container.

Preferably, in a method according to the disclosure it can be provided that to acquire the unit-related metadata an individual metadata structure is specified and/or to acquire the project-related metadata an overall metadata structure is specified. The individual metadata structure and/or the overall metadata structure can specify particular data parameters that are acquired when the unit-related and/or project-related metadata are acquired. Furthermore, a specific format of the unit-related and/or project-related metadata can be specified by the individual metadata structure and/or the overall metadata structure, which means standardization can be achieved. Due to the individual metadata structure and/or the overall metadata structure, the unit-related and/or project-related metadata can therefore be predictable for the receiver system in order to advantageously enable automated further processing of the unit-related and/or project-related metadata. Furthermore, it can thus be verified whether all data parameters required by the individual metadata structure and/or the overall metadata structure have been retrieved during the extraction from the project database and therefore the transmission-compatible data structure is complete.

It is also conceivable in a method according to the disclosure that, during synchronization with the project database, the project-related metadata, the main identifier and/or the individual identifiers are stored separately from the main container in the project database. This allows the validity of the data to be verified even after synchronization. In addition, the main identifiers and/or individual identifiers can be accessed at a later stage to check whether there has been no further manipulation of the associated data. By storing the project-related metadata, a convenient summary of the content and/or origin can also be made possible.

In the context of the disclosure, it is further conceivable that the data units and/or the unit-related metadata are compressed and/or encrypted when the individual containers are created and/or, that the individual containers and/or the project-related metadata are compressed and/or encrypted when the main container is created. Encryption allows the data to be transferred securely from the transmitter system to the receiver system. Compression can simplify data transfer by reducing the data volume. For example, low bandwidth and/or less storage space may be required. By using compression and/or encryption when creating the individual containers and/or the main container, the compression and/or encryption can be advantageously used when creating the transfer-compatible data structure. In particular, they can provide standardized units, which allows requirements on the receiver system for the interpretation of the project data to be reduced.

Preferably, in a method according to the disclosure, it can be provided that, in particular for providing the data units, a validation process is carried out with the following steps:
  obtaining at least one of the data units, in particular by means of the transmitter system and/or the computing unit,
  obtaining an external unique individual identifier of the data unit obtained, in particular by means of the transmitter system and/or the computing unit,
  mapping a data content of the data unit obtained in an internal, unique individual identifier of the data unit obtained, in particular by means of the transmitter system and/or the computing unit,
  validating the data unit obtained by comparison of the external unique individual identifier and the internal unique individual identifier, in particular by means of the transmitter system and/or the computing unit.

Depending on the validation, a validation protocol can be created. The validation process can be carried out in particular for data units which the transmitter system receives from an upstream delivery system. For example, the delivery system may be a system of a supplier for providing individual parts of the device. The validation process can ensure that the data units received have not been manipulated and/or are complete. In this case, the received data unit and the external unique individual identifier can be obtained by the receiving system from the delivery system via different interfaces and/or at different times. The fact that the external unique individual identifier is transferred separately and the data content of the data unit obtained is mapped to an internal individual identifier by the transmitter system itself, the validation of the data unit can be carried out in a simple manner. The validation operation can be repeated for all data units received.

In a method according to the disclosure, it can be advantageously provided that for at least one, preferably more than one or each one, of the data units, a verification operation for checking a data format of the respective data unit is carried out when the individual containers are created, wherein, depending on the verification operation, an adjustment operation for automatic conversion of the data unit into a default format is carried out. For example, the data format of the data unit can be converted to the default format during the adjustment operation if the data format of the data unit deviates from the default format. It may also be provided that during the verification operation, the data format of the data unit is first determined and the adjustment operation is only carried out for one or more predetermined data formats. It is therefore conceivable that during the verification operation it will first be determined whether the data unit has the data format of a PDF file, and then checked whether the PDF file complies with a PDF/A file format. The adjustment operation can automatically perform a conversion to the PDF/A file format if the data unit has the PDF file format but does not simultaneously comply with the default PDF/A file format. Thus, it can be ensured that the data units satisfy predetermined standardizations and/or quality specifications. For example, the automatic conversion can ensure that all data units meet long-term archiving specifications, in particular without the need for additional user intervention.

In accordance with a further aspect of the disclosure, a computer program product is provided. The computer program product comprises commands, which during their execution by a computing unit, cause the computing unit to carry out a method according to the disclosure.

This means that a computer program product according to the disclosure has the same advantages as those which have been explained in detail with reference to a method according to the disclosure. The method can be, in particular, a computer-implemented method. The computer program product can be implemented as computer-readable instruction code in any suitable programming language, such as JAVA, C++, C# and/or Python. The computer program product may be stored on a computer-readable storage medium such as a data disk, removable drive, a volatile or non-volatile memory, or a built-in memory/processor. The instruction code can influence and/or control the computing unit, preferably in the form of a computer or other programmable device such as a control unit, in such a way that the desired functions are carried out. In addition, the computer program product can be made available or provided in a network such as the Internet, from which it can be downloaded or executed online by a user if required. The computer program product can be realized both by means of software and by means of one or more special electronic circuits, i.e. in hardware or in any hybrid form, i.e. by means of software components and hardware components.

In accordance with a further aspect of the disclosure, a transmitter system is provided. The transmitter system comprises a computing unit for carrying out a method according to the disclosure.

Thus, a transmitter system according to the disclosure has the same advantages as those which have been explained in detail with reference to a method according to the disclosure and/or a computer program product according to the disclosure. The computing unit preferably comprises a processor and/or microprocessor. Furthermore, it is conceivable that the computing unit may comprise a plurality of computing modules for the decentralized execution of computing operations. This can result in a distributed module structure. Furthermore, the transmitter system can comprise a project database in which the project data is stored. Preferably, the transmitter system is connected to a transmitter plant for producing devices for a project to which the project data is assigned.

In accordance with a further aspect of the disclosure, a transmission system is provided. The transmission system has a transmitter system according to the disclosure. Furthermore, the transmission system comprises a receiver system for receiving project data from the transmitter system.

A transmission system according to the disclosure therefore provides the same advantages as those which have been explained in detail with reference to a method according to the disclosure, to a computer program product according to the disclosure and/or a transmitter system according to the disclosure. By means of the method according to the disclosure, project data can be transmitted from the transmitter system to the receiver system in an advantageous manner. In particular, a high degree of automation can be achieved, so that firstly, a high level of data security is achieved and secondly, processing time can be reduced.

Other benefits, features, and details of the disclosure emerge from the following description, in which exemplary embodiments of the disclosure are described in detail by reference to the drawings. The features identified in the claims and in the description can be essential to the disclosure, either individually or in any desired combination. In the drawings:

BRIEF DESCRIPTION OF THE DRAWINGS

FIG. 3 shows a transmission system according to the disclosure with a transmitter system according to the disclosure for carrying out the method;

DETAILED DESCRIPTION

In the following description of some exemplary embodiments of the disclosure, the identical reference signs are used for the same technical features in different embodiments.

Figure 1:
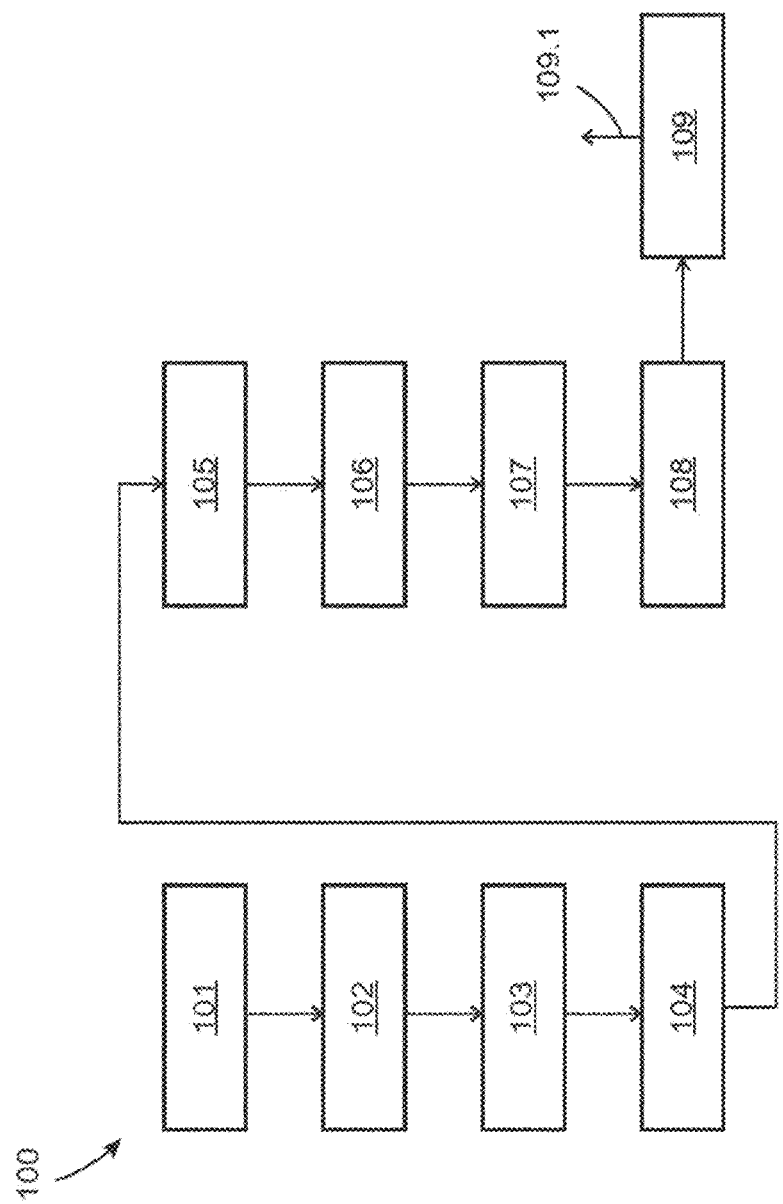
FIG. 1 shows a method according to the disclosure for supporting a data transfer in a schematic representation of method steps.

FIG. 1 shows a method 100 according to the disclosure for supporting a data transfer of project data 200 from a transmitter system 1 to a receiver system 2, in a schematic representation of a sequence of method steps in a first exemplary embodiment.

A transmission system 4 according to the disclosure with the transmitter system 1 and the receiver system 2 for obtaining the project data 200 from the transmitter system 1 is shown in FIG. 3. The transmitter system 1 comprises a computing unit 5 for carrying out the method 100. For example, a computer program product may be provided which comprises commands which, during execution by the computing unit 5, cause the computing unit 5 to execute the method 100. The project data 200 is preferably assigned to a device 3 to be produced, or produced and/or delivered. For this purpose, the transmitter system 1 may be connected, for example, to a transmitter plant 8 for producing the device 3. The device 3 can be transferred from the transmitter plant 8 to a receiver plant 9 connected to the receiver system 2. The data transfer of the project data 200 can be carried out together with the transfer of the device 3 or separately from the device 3. Preferably, the project data 200 includes technical information, such as an operating manual, drawings or technical data sheets, relating to the device 3.

To prepare the data transfer, the method 100 comprises providing 101 a plurality of data units 201 of the project data 200 by the transmitter system 1. Preferably, the data units 201 can each be provided in the form of a file. For this purpose, the data units 201 can advantageously be extracted automatically from a project database 6 of the transmitter system 1. The project database 6 may, for example, comprise a document management system from which the data units 201 are automatically read out. It is conceivable that the data units 201 are at least partially created from the project data 200 during provision 101 of the data units 201. For example, individual files can be created from the project data 200.

Furthermore, the method 100 comprises acquiring 103 unit-related metadata 202 for information on a data context for each of the data units 201. For this purpose, an individual metadata structure can be specified for the unit-related metadata 202. The unit-related metadata 202 may include, for example, defined information about the content, origin and/or data type of the respective data unit 201. Preferably, the unit-related metadata 202 is extracted from the project database 6 together with the data units 201.

Figure 2:
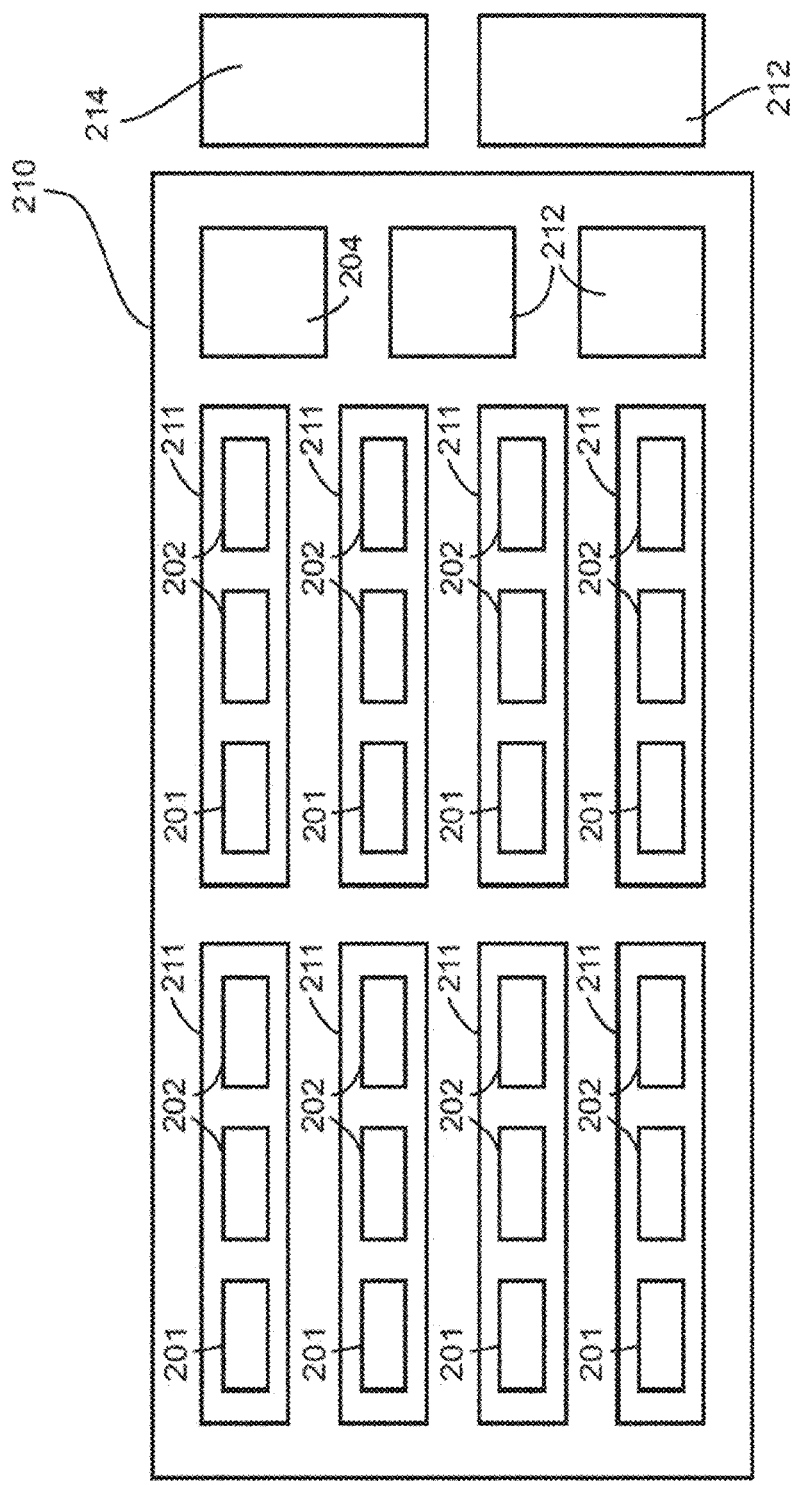
FIG. 2 shows a transfer-compatible data structure for the data transfer.

Based on the unit-related metadata 202 and the data units 201, a transfer-compatible data structure is created, which is schematically illustrated in FIG. 2. For this purpose, a plurality of individual containers 211 is first created 104. In each individual container 211, one of the data units 201 and the assigned, unit-related metadata 202 are stored separately from each other. Preferably, the unit-related metadata 202 is stored in machine-interpretable and/or human-interpretable form when the individual containers 211 are created 104. It may be provided for this purpose that a machine-interpretable file, for example in the form of an XML file, and a human-readable file, for example in the form of a PDF file, of the unit-related metadata 202 is created. Preferably, the data units 201 and/or the unit-related metadata 202 are compressed and/or encrypted when the individual containers 211 are created 104. For example, the individual container 211 can be created in the form of a zip file. In particular, a data format of the data units 201 can be checked when the individual containers 211 are created 104. To do so, the data units 201 can be converted to a default format for storing in the individual containers 211, depending on the verification of the data format.

Furthermore, project-related metadata 212 is acquired 106 for information about a data context of the individual containers 211 and a main container 210 is created 107, in which the individual containers 211 and the project-related metadata 212 are stored separately from each other. For the acquisition 106 of the project-related metadata 212, an overall metadata structure can advantageously be specified. For example, when the project-related metadata 201 is acquired 106, a summary of the content of the individual containers 211 can be created.

It may be provided that the unit-related metadata 202, the project-related metadata 212 and/or the data units 201 comprise identification information for assignment to the device 3. For example, a QR code and/or a serial number can be both attached to the device 3 and integrated into the unit-related metadata 202, the project-related metadata 212 and/or the data units 201. This may also enable a simplified assignment of the data to the device 3 at a later date.

Then, a main container 210 is created 107, in which the individual containers 211 and the project-related metadata 212 are stored separately from each other. Preferably, the project-related metadata 212 is stored in machine-interpretable and/or human-interpretable form when the main container 210 is created. Furthermore, the individual containers 211 and/or the project-related metadata 212 are compressed and/or encrypted when the main container 210 is created. For example, the main container 210 can be created in the form of a zip file.

After the creation 107 of the main container 210, the main container 210 is output 109 by transmitter system 1 for the receiver system 2. In this case, the main container 210 can be sent, for example, from the transmitter system 1 to the receiver system 2 via a communication link. However, it is also conceivable that the container is output 109 to an external data carrier. In order to achieve reliable documentation, a synchronization 109.1 of the individual containers 211 and/or the main container 210 with the project database 6 can also be performed. During synchronization 109.1 with the project database 6, the project-related metadata 212, in particular in addition, can be stored in the project database 6 separately from the main container 210.

To increase the level of automation further, automatic access to a receiver database 7 of the receiver system 2 can be made when the main container 210 is output 109. For example, the receiver system 2 may have a receiving interface for this purpose, which enables the external access for reading the project data 200. For this purpose, the data units 201 can be read out from the main container 210 using the unit-related and/or project-related metadata 202, 212 and stored in the receiver database 7 of the receiver system 2.

Figure 4:
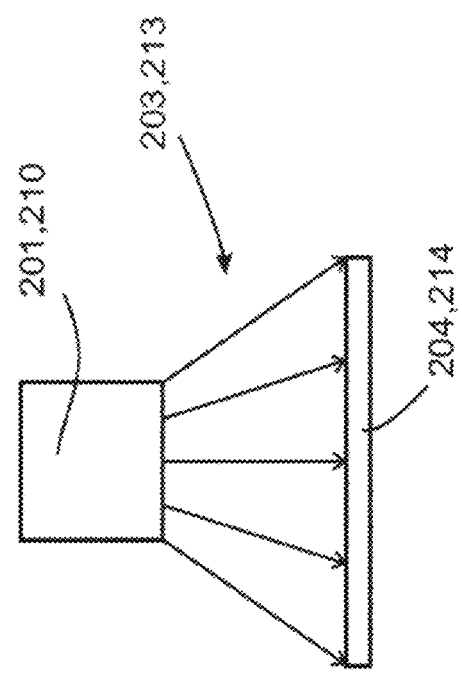
FIG. 4 shows a mapping of data content in the method.

As shown in FIG. 4, in order to increase data security during the data transfer, the data content 203 of at least one of the data units 201 and/or at least one of the individual containers 211 can be mapped 105 in a unique individual identifier 204. In particular, the mapping 105 of the data content 203 for each of the individual containers 211 and/or each of the data units 201 is performed in a unique individual identifier 204. In addition or alternatively, in particular, a data content 213 of the main container 210 can be mapped 108 in a unique main identifier 214 of the main container 210 in the same way. During the mapping 105, 108 of the data contents 203, 213, the individual identifier 204 and/or the main identifier 214 can be computed, for example, by a hash function. In this process, the data content 203, 213 is reduced to a character string, which is unique for the particular data content 203, 213. If the data content changes 203, 213, the string derived from it also changes as the result of an avalanche effect, so that any change in the data content 203, 213 can be easily detected, for example without opening the main container 210, the individual containers 211 and/or the data units 201. When the main container 210 is created, the unique individual identifier 204 can therefore be advantageously stored separately from the individual container 211, in particular from the individual container 211 assigned to the respective data unit 201, and/or separately from the main container 210. In particular, multiple or all individual identifiers 204 can be stored in the form of an individual file. The unique main identifier 214 can be advantageously stored separately from the main container 210 and/or output separately from the main container 210 for the receiver system 2. The individual identifiers 204 and/or the main identifier 214 can thus be in particular hash codes.

Figure 5:
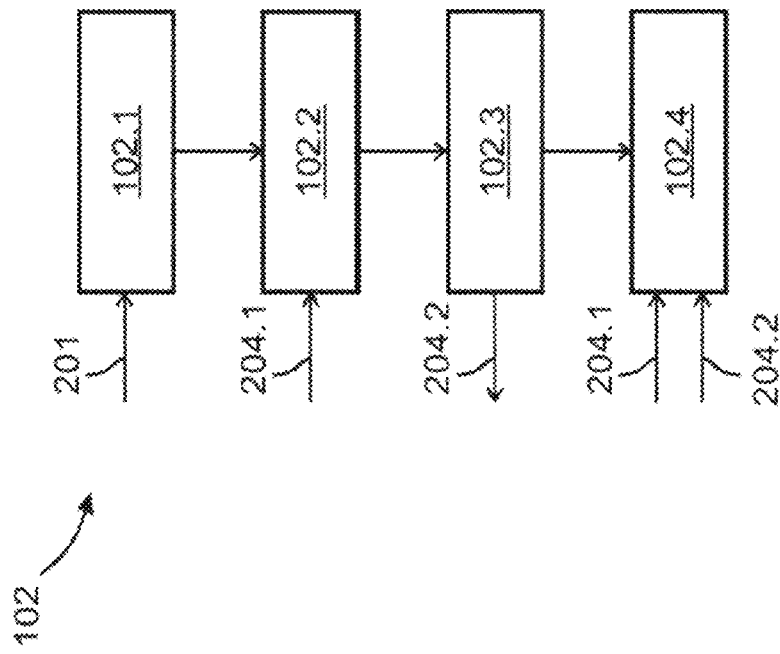
FIG. 5 shows a validation operation in the method.

Furthermore, it may be provided that the data units 201 are provided at least partially externally for the transmitter system 1. For example, it may be provided that a supplier supplies parts of the device 3 and the data units 201 are at least partially assigned to the delivered parts. A validation operation 102 can be performed to provide 101 the data units 201. The validation operation 102 is shown schematically in FIG. 5. In this case, at least one of the data units 201 is obtained 102.1 from the supplier by the transmitter system 1. Subsequently or in parallel, an external unique individual identifier of the obtained data unit 201 is obtained 102.2 from the supplier by the transmitter system 1. In order to finally validate the data unit 201 obtained, the validation operation 102 further comprises mapping 102.3 the data content 203 of the obtained data unit 201 in an internal, unique individual identifier 204.2 of the obtained data unit 201 and validating 102.4 the obtained data unit 201 by comparison of the external unique individual identifier 204.1 and the internal unique individual identifier 204.2. If the external unique individual identifier 204.1 and the internal unique individual identifier 204.2 match, it can be assumed that the data unit 201 obtained is valid, i.e., for example, it was not changed during transmission. Furthermore, this results in verifiability of the data paths, e.g. for a warranty issue at a later time.

The preceding explanation of embodiments describes the present disclosure exclusively within the context of examples. Of course, the individual features of the embodiments, where technically feasible, can be freely combined with each other without departing from the scope of the present disclosure.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

LIST OF REFERENCE SIGNS

1 transmitter system
2 receiver system
3 device
4 transmission system
5 computing unit
6 project database
7 receiver database
8 transmitter plant
9 receiver plant
100 method
101 provision of 201
102 validation operation
102.1 obtaining 201
102.2 obtaining 204.1
102.3 mapping of 203
102.4 validation of 201
103 acquisition of 202
104 creation of 211
105 mapping of 203
106 acquisition of 212
107 creation of 210
108 mapping of 213
109 output of 210
109.1 synchronization with 6
200 project data
201 data units
202 unit-related metadata
203 data content
204 individual identifier
210 main container
211 individual container
212 project-related metadata
214 main identifier

The invention claimed is:

1. A method for supporting a data transfer of project data from a transmitter system to a receiver system, the method comprising the steps of:
  providing a plurality of data units of the project data by the transmitter system;
  acquiring unit-related meta data for information on a data context for each of the data units;
  creating a plurality of individual containers, wherein one of the data units and the assigned metadata are stored separately from each other in each individual container;
  acquiring project-related metadata for information about a data context of the individual containers;
  creating a main container in which the individual containers and the project-related metadata are stored separately from each other; and
  outputting the main container via the transmitter system for the receiver system.

2. The method as claimed in claim 1, wherein the project data is assigned to a device that is to be produced, or has been produced and/or delivered, and wherein the unit-related metadata and/or the project-related metadata comprise identification information for assignment to the device.

3. The method as claimed in claim 2, wherein the unit-related metadata are stored in machine-interpretable and/or human-interpretable form when the individual containers are created and/or that the project-related metadata are stored in machine-interpretable and/or human-interpretable form when the main container is created.

4. The method as claimed in claim 3, wherein the provision of the data units and/or the acquisition of the unit-related metadata comprises an automatic extraction of the data units from a project database of the transmitter system.

5. The method as claimed in claim 4, wherein a synchronization of the individual containers and/or the main container with the project database is carried out.

6. The method as claimed in claim 5, wherein when the main container is output, a receiver database is accessed automatically, wherein the data units are read from the main container based on the unit-related and/or the project-related metadata and are stored in the receiver database of the receiver system.

7. The method as claimed in claim 6, further comprising:
mapping a data content of at least one of the data units and/or at least one of the individual containers in at least one unique individual identifier, wherein
when the main container is created, the unique individual identifier is stored separately from the individual container, in particular from the individual container assigned to the respective data unit, and/or separately from the main container.

8. The method as claimed in claim 7, further comprising:
mapping a data content of the main container in a unique main identifier of the main container, wherein
the unique main identifier is stored separately from the main container and/or output separately from the main container for the receiver system.

9. The method as claimed in claim 8, wherein in acquiring the unit-related metadata an individual metadata structure and/or in acquiring the project-related metadata an overall metadata structure is specified.

10. The method as claimed in claim 9, wherein during synchronization with the project database the project-related metadata, the main identifier and/or the individual identifiers are stored separately from the main container in the project database.

11. The method as claimed in claim 10, wherein the data units and/or the unit-related metadata are compressed and/or encrypted when the individual containers are created, and/or the individual containers and/or the project-related metadata are compressed and/or encrypted when the main container is created.

12. The method as claimed in claim 11, wherein in providing the data units a validation operation includes:
obtaining at least one of the data units;
obtaining an external unique individual identifier of the data unit obtained;
mapping a data content of the obtained data unit in an internal, unique individual identifier of the obtained data unit; and
validating the obtained data unit by comparing the external unique individual identifier and the internal unique individual identifier.

13. A non-transitory computer-readable storage medium storing commands which, when executed by a computing unit, cause the computing unit to carry out the method as claimed in claim 1.

14. A transmitter system comprising:
a computing unit configured to carry out the method as claimed in claim 1.

15. A transmission system comprising:
the transmitter system as claimed in claim 14; and
a receiver system configured to obtain project data from the transmitter system.

* * * * *